(12) United States Patent
Johnston et al.

(10) Patent No.: US 12,529,858 B1
(45) Date of Patent: Jan. 20, 2026

(54) STRANDED OPTICAL FIBER CABLE

(71) Applicant: CORNING RESEARCH & DEVELOPMENT CORPORATION, Corning, NY (US)

(72) Inventors: Peter J. Johnston, Taylorsville, NC (US); Christopher Mark Quinn, Hickory, NC (US); David Alan Seddon, Advance, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 19/272,729

(22) Filed: Jul. 17, 2025

Related U.S. Application Data

(60) Provisional application No. 63/836,682, filed on Jul. 1, 2025, provisional application No. 63/673,367, filed on Jul. 19, 2024.

(51) Int. Cl.
*G02B 6/44* (2006.01)

(52) U.S. Cl.
CPC .................. *G02B 6/4434* (2013.01)

(58) Field of Classification Search
CPC ........................................ G02B 6/44
USPC ........................................ 385/100
See application file for complete search history.

(56) References Cited

U.S. PATENT DOCUMENTS

| | | | |
|---|---|---|---|
| 6,895,155 B2 * | 5/2005 | Gasca | G02B 6/02314 385/12 |
| 9,658,393 B2 * | 5/2017 | Digiovanni | G02B 6/032 |
| 11,156,768 B2 | 10/2021 | Digiovanni et al. | |
| 11,747,552 B1 * | 9/2023 | Cataletto | G02B 6/3807 385/125 |
| 11,835,755 B2 | 12/2023 | Harker et al. | |
| 2002/0136511 A1 | 9/2002 | Cecchi et al. | |
| 2003/0174977 A1 * | 9/2003 | Mayer | G02B 6/4411 385/100 |
| 2005/0103518 A1 * | 5/2005 | Glew | G02B 6/4489 174/113 C |

(Continued)

FOREIGN PATENT DOCUMENTS

| | | | | |
|---|---|---|---|---|
| WO | WO-2020070488 A1 * | 4/2020 | | G01M 11/33 |
| WO | 2023/234355 A1 | 12/2023 | | |

(Continued)

OTHER PUBLICATIONS

International Search Report and Written Opinion of the International Searching Authority; PCT/US2025/037299; mailed on Nov. 4, 2025; 9 pages; Commissioner for Patents.

*Primary Examiner* — Kaveh C Kianni
(74) *Attorney, Agent, or Firm* — Russell S. Magaziner

(57) ABSTRACT

An optical fiber cable comprises a plurality of buffer tubes, a hollow-core optical fiber disposed within one of the plurality of buffer tubes, and a central strength member. The plurality of buffer tubes are helically stranded about the central strength member, where a diameter d of the central strength member and a lay length l of the plurality of buffer tubes around the central strength member satisfy the following inequality: $d \leq 0.075l - 6.875$. A cable jacket surrounds the plurality of buffer tubes, where a radius of curvature of the hollow-core optical fiber, when the optical fiber cable is kept straight at a temperature of 20° C., is 200 mm or greater.

17 Claims, 5 Drawing Sheets

(56) References Cited

U.S. PATENT DOCUMENTS

| | | | |
|---|---|---|---|
| 2007/0047885 A1* | 3/2007 | Mayer | G02B 6/4403 |
| | | | 385/100 |
| 2007/0237460 A1* | 10/2007 | Fan | G01N 21/7746 |
| | | | 385/12 |
| 2009/0059966 A1* | 3/2009 | Mayer | G02B 6/4403 |
| | | | 385/105 |
| 2021/0396927 A1* | 12/2021 | Harker | H04B 10/073 |
| 2022/0187532 A1 | 6/2022 | Unnimadhava Kurup Soudamini Amma et al. | |
| 2023/0014659 A1 | 1/2023 | Corrado et al. | |
| 2024/0036252 A1* | 2/2024 | Dainese, Jr. | G02B 6/032 |
| 2024/0176088 A1 | 5/2024 | Blazer et al. | |

FOREIGN PATENT DOCUMENTS

| | | |
|---|---|---|
| WO | 2024/015049 A1 | 1/2024 |
| WO | 2024/035511 A1 | 2/2024 |

\* cited by examiner

STRANDED OPTICAL FIBER CABLE

PRIORITY

This application claims the priority benefit of U.S. Application No. 63/836,682 filed Jul. 1, 2025 and U.S. Application No. 63/673,367 filed Jul. 19, 2024, each of which is hereby incorporated by reference herein in its entirety.

BACKGROUND

The present disclosure relates to optical fiber cable, and more specifically to stranded loose-tube or tight-buffer cable supporting specialized optical fibers, such as optical fibers designed to communicate optical signals through a hollow core.

Optical fiber cables may include one or more optical fibers disposed within a cable jacket. The optical fiber may include a core, a cladding, and a coating surrounding the cladding to protect the optical fiber. The core may be solid glass through which an optical signal may propagate. However, specialized optical fibers have been developed, such as those formed with a hollow core or free space in air or a vacuum along which an optical signal may propagate. Due to propagation of an optical signal in air or vacuum rather than a solid glass core, latency of an optical signal may less. Different hollow-core and other specialized optical fibers have varying designs. Some such specialized or new optical fibers may break or attenuate when packaged in a cable or otherwise handled.

A need exists for new cables and methods of making and handling the same that support such optical fibers.

SUMMARY OF THE DISCLOSURE

The following is a brief summary of subject matter that is described in greater detail herein. This summary is not intended to be limiting as to the scope of the claims.

According to an Aspect A1 of the present disclosure, an optical fiber cable comprises a first capillary comprising glass and surrounding an interior passage thereof. A first nested capillary is positioned within the interior passage of the first capillary, where the first nested capillary has an open space extending lengthwise therein. However, the first nested capillary only fills a portion of the interior passage of the first capillary such that the interior passage is sized to fit at least another two more such nested capillaries therein. The optical fiber cable further includes a first cladding having a round cross-section and surrounding the first capillary and in turn the first nested capillary. The first capillary is fixed to an interior surface of the first cladding, where the first cladding likewise surrounds at least two other such capillaries fixed to the interior surface thereof. Each of the capillaries are positioned around the interior surface of the first cladding. Portions of exteriors of each of the capillaries line a hollow core between the portions, where the hollow core is configured to convey an optical signal communicated lengthwise along the hollow core. As such, the first cladding, the first capillary, and the first nested capillary each form part of a first optical fiber. The optical fiber cable further includes a first buffer tube comprising a polymer and having a cross-sectional dimension orthogonal to a length thereof at least five times that of the first cladding. The first buffer tube surrounds the first optical fiber and at least two other optical fibers all loosely positioned with respect to one another within the first buffer tube such that the optical fibers are at least partially free to move with respect to one another in the first buffer tube. The optical fiber cable still further includes a cable jacket surrounding a strength member, the first buffer tube, and at least two other buffer tubes comprising optical fibers comprising claddings, capillaries, and nested capillaries therein. Each of the buffer tubes are stranded around the strength member within the cable jacket such that the optical fibers each have a longer length then the optical fiber cable, where the stranding is such that the first buffer tube bends no tighter than an arc of 200 mm radius within the cable jacket (i.e. meaning that bend radius is at least 200 mm or greater, and/or a non-infinite value).

According to an Aspect A2, with the optical fiber cable of Aspect A1, the first buffer tube has a thickness at least 5 times thicker than a thickness of the first cladding, and wherein the cable jacket has a thickness at least 5 times thicker than the thickness of the first buffer tube.

According to an Aspect A3, with the optical fiber cable of Aspect A1 or A2, the first optical fiber has a length greater than or equal to that of the first buffer tube, and less than 3% longer than the first buffer tube.

According to an Aspect A4, with the optical fiber cable of any one of Aspects A1, A2, or A3, the stranding is such that the first cladding bends no tighter than an arc of 200 mm radius within the first buffer tube.

According to an Aspect A5, with the optical fiber cable of any one of Aspects A1 to A4, the first buffer tube comprises gel surrounding the first optical fiber and impeding a flow path for water through the first buffer tube.

According to an Aspect A6, with the optical fiber cable of any one of Aspects A1 to A5, the first cladding comprises glass, where the glass of the first cladding comprises, in terms of mole percent on a representative oxide basis, at least 60 mol % silica. The glass of the first cladding has a coefficient of thermal expansion and a modulus of elasticity. Further, the cable jacket comprises a polymer, where the polymer has a coefficient of thermal expansion greater than that of the glass of the first cladding and a modulus of elasticity less than that of the glass of the first cladding.

According to an Aspect A7, with the optical fiber cable of any one of Aspects A1 to A6, when the optical fiber cable is at 50° C., tension in the strength member opposes compression in the jacket, while the optical fibers experience no stress or stress less than 5 MPa.

According to an Aspect A8, with the optical fiber cable of any one of Aspects A1 to A7, when the optical fiber cable is at 50° C., hollow cores of the optical fibers move closer to the strength member on average than when the optical fiber cable is at 20° C.

According to an Aspect A9, with the optical fiber cable of any one of Aspects A1 to A8, each of the capillaries are spaced apart from one another around the interior surface of the first cladding.

According to an Aspect A10, with the optical fiber cable of any one of Aspects A1 to A9, the stranded buffer tubes are a first group, where the optical fiber cable further comprises a second group of stranded buffer tubes overlaying the first group. The first and second groups are helically stranded in opposite directions from one another around the strength member, where the second group has a lay length that is greater than that of the first group.

According to an Aspect B1, an optical fiber cable comprises a first capillary, comprising glass and surrounding an interior passage thereof, and a first nested capillary positioned within the interior passage of the first capillary. The first nested capillary has an open space extending lengthwise therein, and the first nested capillary only fills a portion of the interior passage of the first capillary such that the interior passage is sized to fit at least another two more such nested capillaries therein. The optical fiber cable further comprises a first cladding having a round cross-section and surrounding the first capillary and in turn the first nested capillary. The first capillary is fixed to an interior surface of the first cladding, where the first cladding likewise surrounds at least two other such capillaries fixed to the interior surface thereof. The first cladding comprises glass, where the glass of the first cladding comprises, in terms of mole percent on a representative oxide basis, at least 60 mol % silica. As such, the glass of the first cladding has a coefficient of thermal expansion and a modulus of elasticity. Each of the capillaries are positioned around the interior surface of the first cladding. Portions of exteriors of each of the capillaries line a hollow core therebetween, where the hollow core is configured to convey an optical signal communicated lengthwise along the hollow core. Accordingly, the first cladding, the first capillary, and the first nested capillary each form part of a first optical fiber. The optical fiber cable further comprises a first buffer tube comprising a polymer and having a cross-sectional dimension orthogonal to a length thereof at least five times that of the first cladding. The first buffer tube surrounds the first optical fiber and at least two other optical fibers all loosely positioned with respect to one another within the first buffer tube such that the optical fibers are at least partially free to move with respect to one another in the first buffer tube. The optical fiber cable further comprises a cable jacket surrounding a strength member, the first buffer tube, and at least two other buffer tubes comprising optical fibers comprising claddings, capillaries, and nested capillaries in the other buffer tubes. The cable jacket comprises a polymer, where the polymer has a coefficient of thermal expansion greater than that of the glass of the first cladding and a modulus of elasticity less than that of the glass of the first cladding. Each of the buffer tubes are stranded around the strength member within the cable jacket such that the optical fibers each have a longer length then the optical fiber cable. When the optical fiber cable is at 50° C., hollow cores of the optical fibers move closer to the strength member on average than when the optical fiber cable is at 20° C. At 50° C., tension in the strength member opposes compression in the jacket, while the optical fibers experience no stress or stress less than 5 MPa.

According to an Aspect B2, with the optical fiber cable of Aspect B1, the first buffer tube has a thickness at least 5 times thicker than a thickness of the first cladding, and the cable jacket has a thickness at least 5 times thicker than the thickness of the first buffer tube.

According to an Aspect B3, with the optical fiber cable of Aspect B1 or B2, the first optical fiber has a length greater than or equal to that of the first buffer tube, and less than 3% longer than the first buffer tube.

According to an Aspect B4, with the optical fiber cable of any one of Aspects B1 to B3, the stranding is such that the first cladding bends no tighter than an arc of 200 mm radius within the first buffer tube.

According to an Aspect B5, with the optical fiber cable of any one of Aspects B1 to B4, the first buffer tube comprises gel surrounding the first optical fiber and impeding a flow path for water through the first buffer tube.

According to an Aspect B6, with the optical fiber cable of any one of Aspects B1 to B5, a diameter d of the strength member and a lay length l of the buffer tubes stranded around the strength member satisfy the following inequality: $d \leq 0.075l - 6.875$.

According to an Aspect B7, with the optical fiber cable of the Aspect B6, the diameter d and the lay length l also satisfy the following inequality: $d \leq 0.092l - 10.5$.

According to an Aspect B8, with the optical fiber cable of any one of Aspects B1 to B5, a diameter d of the strength member and a lay length l of the buffer tubes stranded around the strength member satisfy the following inequality: $d \leq 0.092l - 10.5$.

According to an Aspect C1, an optical fiber cable comprises a plurality of buffer tubes, a hollow-core optical fiber disposed within one of the plurality of buffer tubes, and a central strength member. The plurality of buffer tubes are helically stranded about the central strength member, where a diameter d of the central strength member and a lay length l of the plurality of buffer tubes around the central strength member satisfy the following inequality: $d \leq 0.075l - 6.875$. A cable jacket surrounds the plurality of buffer tubes, where a minimum radius of curvature i.e. tightest curvature of the hollow-core optical fiber, when the optical fiber cable is kept straight at a temperature of 20° C. (i.e. and where the cable is not under an applied tension or compression), is 200 mm (i.e. the curvature has a radius of 200 mm or greater, such as non-infinite).

According to an Aspect C2, with the optical fiber cable of Aspect C1, each of the plurality of buffer tubes has an outside diameter of 2.5 mm±5%.

According to an Aspect C3, with the optical fiber cable of Aspect C1, each of the plurality of buffer tubes has an outside diameter of 1.5 mm±5% and wherein d and l additionally satisfy the following inequality: $d \leq 0.092l - 10.5$.

According to an Aspect DI, an optical fiber cable comprises a plurality of buffer tubes, a hollow-core optical fiber disposed within one of the plurality of buffer tubes, and a central strength member. The plurality of buffer tubes are helically stranded about the central strength member, where a diameter d of the central strength member and a lay length l of the plurality of buffer tubes around the central strength member satisfy the following inequality: $d \leq 0.092l - 10.5$. A cable jacket surrounds the plurality of buffer tubes, where a minimum radius of curvature i.e. tightest curvature of the hollow-core optical fiber, when the optical fiber cable is kept straight at a temperature of 20° C., is 200 mm.

The above summary presents a simplified summary in order to provide a basic understanding of some aspects of the systems and/or methods discussed herein. This summary is not an extensive overview of the systems and/or methods discussed herein. It is not intended to identify key or critical elements or to delineate the scope of such systems and/or methods. Its sole purpose is to present some concepts in a simplified form as a prelude to the more detailed description that is presented later.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
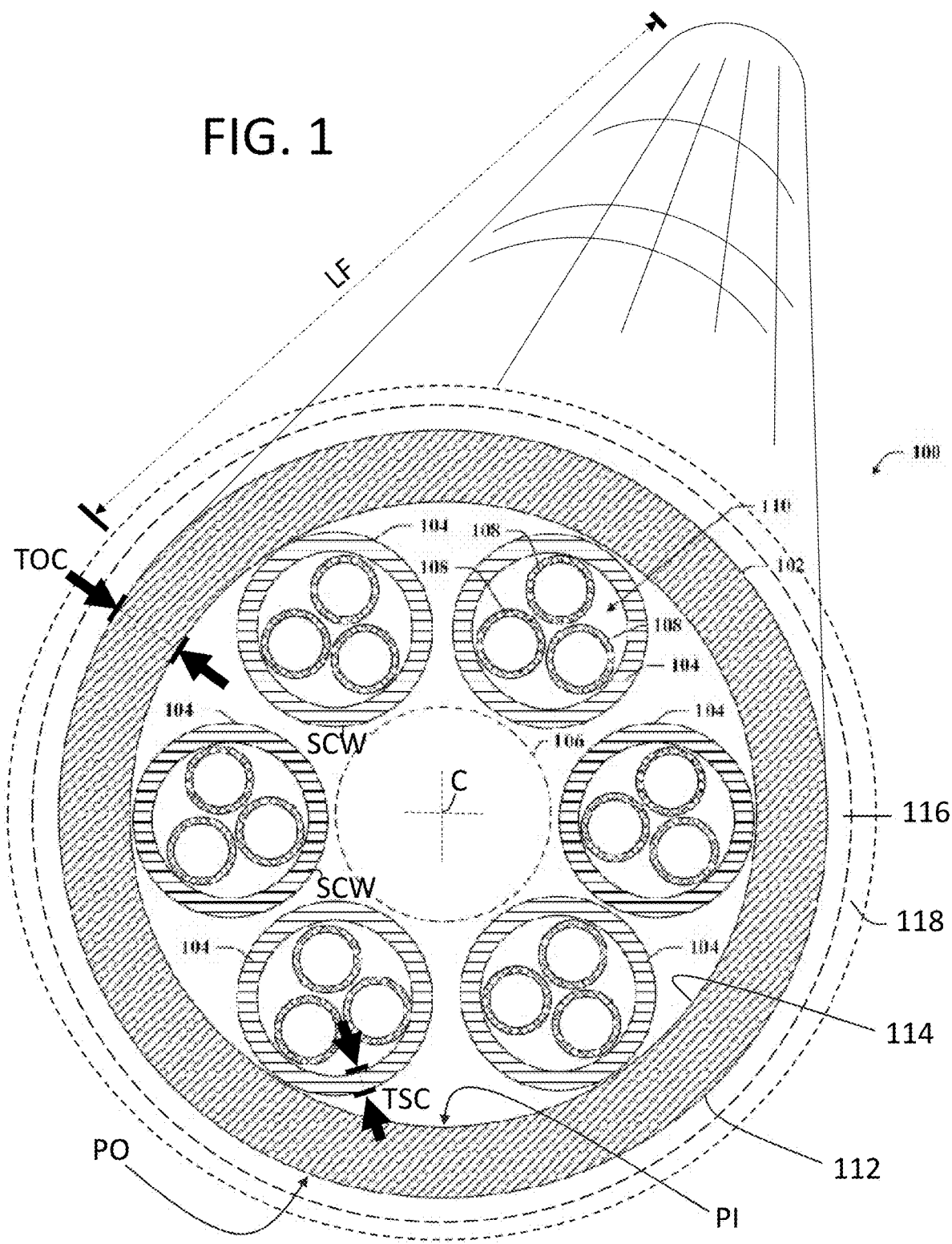
FIG. 1 is a cross-sectional view of an optical fiber according to an aspect of the present disclosure.

Various technologies pertaining to an optical fiber cable are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices may be shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Referring now to FIG. 1, a cross-sectional view of an optical fiber 100 is illustrated. According to an aspect, the optical fiber 100 comprises a cladding 102 (e.g., cladding, tunnel, channel, passageway, pipe). According to an aspect, the cladding 102 of the optical fiber 100 has an outer surface 112 and an inner surface 114.

The outer and inner surfaces 112, 114 of the cladding 102 may be spaced apart from one another by a thickness TOC of material (e.g., glass) of the cladding 102. According to an aspect, the thickness TOC may be less than 300 µm, such as less than 200 µm, less than 150 µm, less than 100 µm, possibly less than 50 µm, and/or greater than 3 µm, such as greater than 5 µm, such as greater than 10 µm, possibly greater than 15 µm, for example.

According to an aspect the thickness TOC may vary around the cladding 102, when viewed in cross-section, such as where at least one portion of the cladding 102 is thicker than another portion. For example, the thicker portion may be thicker than another portion of the cladding 102 by at least 5% relative thereto, such as at least 10%, at least 20%, and/or less than 200%. Variation in thickness TOC may be due to coupling of interior components of the optical fiber 100 to the cladding 102, such as capillaries 104. That said, in some designs, the cladding 102 of the optical fiber 100 may have a generally constant thickness TOC around a perimeter of the cladding 102, such as within ±20% of a certain thickness (e.g., ±15%, ±10%, ±5%), such as a mean or median thickness TOC, such as where the cladding 102 is largely independent of interior components of the optical fiber 100. Maintaining a generally constant thickness TOC of the cladding 102 of the optical fiber 100 may help control bending of the optical fiber 100 by mitigating bend preference.

According to an aspect, the cladding 102 is round in cross-section, such as circular or oval. Where outer roundness is $4\pi\times$(area within perimeter $P_O$ defined by the outer surface in cross-section)/(perimeter $P_O$ distance)$^2$, the outer roundness of the cladding 102 of the optical fiber 100 may be less than 1 at least is some parts thereof, but close thereto, such as greater than 0.95, such as greater than 0.99. According to an aspect, the optical fiber 100 has a cross-sectional dimension DOF (see FIG. 2) orthogonal to length (e.g., widest cross-sectional dimension, diameter, major axis dimension) that is less than 500 µm, such as less than 300 µm, and/or at least 50 µm, such as at least 100 µm. Smaller cross-sections may facilitate greater flexibility of the optical fiber 100 and/or a corresponding cable. This cross-sectional dimension may correspond with the diameter of a cladding 102 that may be round, and/or with coating(s) 116, 118 overlaying such a cladding 102.

Similarly, where inner roundness is $4\pi\times$(area within perimeter $P_I$ defined by the inner surface 114 in cross-section)/(perimeter $P_I$ distance)$^2$, the inner roundness of the cladding 102 of the optical fiber 100 may be less than 1, but close thereto, such as greater than 0.95, such as greater than 0.99. It is contemplated the outer or inner surfaces 112, 114 of the cladding 102 may be round (i.e. 1.00 and/or 1.00±0.4) in certain cross-sections and less than round (e.g., 0.99) in other cross-sections along a length LF of the optical fiber 100.

According to an aspect, the outer perimeter PO of the cladding 102 is rounder than the inner perimeter PI, such as by at least 0.01, such as by at least 0.04, such as by at least 0.1, and/or no more than 0.8. Maintaining a generally round shape of the cladding 102 of the optical fiber 100 help control bending of the optical fiber 100 by mitigating bend preference. Non-round geometry of the inner perimeter PI may facilitate coupling of interior elements within the optical fiber 100. That said, Applicants contemplate that the inner perimeter PI may be as round or rounder than the outer perimeter PO, and both may have a roundness greater than 0.99, such as 1.00 and/or 1.00±0.4.

According to an aspect, the cladding 102 provides protection and/or rigidity to the optical fiber 100. The cladding 102 continuously extends for a long, uninterrupted distance along the length LF of the optical fiber 100, without splicing, whereby structural weaknesses and optical variations are mitigated. According to an aspect, the length LF is at least one meter, such as at least ten meters, such as at least thirty meters, and/or less than one hundred kilometers. The length LF may be measured by separating the optical fiber 100 from a cable and measuring the length LF thereof because, as further explained below, the length LF may not match that of the respective cable due to excess fiber length.

According to an aspect, the cladding 102 may comprise (e.g., consist more than 50% by volume of, >80 vol %, >90 vol %, such as 100%) glass, such as a silicate glass. According to an aspect, glass of the cladding 102 may have at least 30 mol % silica ($SiO_2$) and/or less than 99.9% silica (i.e. is a silicate glass other than not fused silica). The glass may further comprise alumina ($Al_2O_3$), such as at least 2 mol % and less than 40 mol %, where the silica and alumina help build a molecular network for the glass. The glass may further include boria ($B_2O_3$), such as at least 2 mol % and less than 40 mol %, which may help lower a liquidus temperature of the glass. The glass may further include titania ($TiO_2$), such as at least 2 mol % and less than 40 mol % for strength and/or optical properties. While oxides provided herein are, by convention, representative of constituents and their respective molar percentages in the glass, the constituents may well be provided to a respective batch melt by more complex compounds as raw materials, such as borax for example. The cladding 102 may comprise or consist of a silica-based glass (e.g., >50 mol % silica). Moreover, capillaries 104 may too comprise or consist of a silica-based glass, such as glass of the same composition. Put another way, each of the capillaries 104 may comprise the same or similar material as the cladding 102.

According to an aspect, the glass of the cladding 102 and/or capillaries 104 may be mostly or fully amorphous, for example having less than 0.1 vol % crystallinity or other inclusions, such as less than 0.05 vol %, such as a non-zero and detectable-amount of crystals or other inclusions; and/or a non-zero and detectable-amount amount but less than 1 vol %. Amorphous glass may have flatter surfaces than glass-ceramic for example, which may help with signal propagation through the optical fiber 100 such as by reducing scatter.

According to aspect, the glass of the cladding 102 may have a coefficient of thermal expansion greater than that of fused silica over a temperature range of 100-300° C., whereby the glass may expand (at least to some degree) as the cable heats, such as greater than 0.25 ppm/K on average over 100-300° C., such as greater than 0.5 ppm/K over that temperature range, such as greater than 1 ppm/K, such as greater than 2 ppm/K, and/or less than 25 ppm/K, mitigating heat-induced expansion mismatch with other elements of the cable.

While the optical fiber 100 transmits light, such as for communication of information carried thereby, glass of the optical fiber 100 may not be particularly translucent. According to an aspect, glass of the cladding 102 may be such that the glass transmits (total transmission) less than 99% of light in a range of 400 to 700 nm directed along 1 mm path length through the glass, such as less than 98%, such as less than 95%. Accordingly, glass of the cladding 102 may appear colored (e.g., dark gray, blue, green). Deeper fiber color may help a handler better see the optical fiber 100, such as during connectorization (i.e. process of building the respective optical fiber into an optical connector) for example.

According to an aspect, within the cladding 102, the optical fiber 100 includes capillaries 104 (e.g., capillary tubes, sub-conduits). The capillaries 104 may be round in cross-section as shown in FIG. 1, or the capillaries 104 may be otherwise shaped (e.g., arch-shaped, oval, minor sector shaped i.e. pie-slice shaped). As discussed above, the capillaries 104 may be directly or indirectly coupled to and/or partially formed from the inner surface 114 of the cladding 102, such as in a case where a capillary in cross-section includes an arch with each leg thereof anchored on the inner surface 114 of the cladding 102. The capillaries 104 may be positioned around the inner perimeter PI of the cladding 102. According to an aspect, the capillaries 104 are equally spaced apart from one another along the inner perimeter PI. As shown in FIG. 1, the optical fiber 100 may have more than one of the capillaries 104, such as at least three or more (e.g., four, five, six).

According to an aspect, the capillaries 104 may comprise glass (e.g., consisting more than 50% by volume of, >80 vol %, >90 vol %, such as 100%) glass, such as a silicate glass of a composition as described above with respect to the cladding 102. Each of the capillaries 104 may comprise (e.g., consist more than 50% by volume of, >80 vol %, >90 vol %, such as 100%) or consist of a silica-based glass (e.g., silica doped with fluorine, germanium). According to an aspect, the glass may be mostly or fully amorphous as discussed above. Amorphous glass may have a flatter surfaces, which may directly or indirectly help with signal propagation through the optical fiber 100 such as by mitigating scatter-based attenuation.

According to an aspect, glass of the cladding 102 and glass of the capillaries 104 may be formed together by a drawing process to form the optical fiber 100, with the capillaries 104 attached to and/or partially forming the inner surface 114 of the cladding 102. As indicated above, glass of the capillaries 104 may have the same composition and/or coefficient of thermal expansion and/or modulus of elasticity as the glass of the cladding 102, which may help the optical fiber 100 to maintain relative dimensions and shape during drawing and cooling of the optical fiber 100.

According to an aspect, the capillary 104 includes a wall SCW (or walls) thereof. The wall SCW of the capillary 104 may have a thickness TSC that is thinner than thickness TOC of the cladding 102, such as where the thickness TSC of at least a portion of the wall SCW is less than half the thickness TOC, such as less than a third, less than a fourth, or may even be less than a fifth the thickness TOC. As such, relative thickness of the cladding 102 compared to capillary 104 and location of the cladding 102, further from a center C (e.g., geometric centroid of cross-section perpendicular to length) of the optical fiber 100 may be such that the cladding 102 largely controls bending performance of the optical fiber 100.

The capillaries 104 are each depicted in FIG. 1 in the optical fiber 100 as having a plurality of nested capillaries 108 (e.g., tubes, straws, rods, micro-pipes), where at least one of the nested capillaries 108 is disposed nested within an interior cavity 110 of a respective capillary 104. Put another way, according to an aspect, the wall SCW of the capillary 104 may surround a space in which is the nested capillary 108. As shown in FIG. 1, the capillary 104 may contain more than one such nested capillary 108, such as two, three, four, etc. According to an aspect, the nested capillary 108 may comprise or consist of a silica-based glass, which may be the same as that of the cladding 102 and/or the wall SCW.

The optical fiber 100 depicted in FIG. 1 is shown as having six of the capillaries 104, and it is to be appreciated that an optical fiber can have various numbers of capillaries 104 (e.g., ≥2, ≥3, ≥4, ≥6, or ≥8 sub-conduits, and/or ≤50, ≤20, ≤10). Furthermore, the optical fiber 100 depicted in FIG. 1 is shown as having nested capillaries 108 in each of the capillaries 104, and it is to be appreciated that an optical fiber can have various numbers of nested capillaries disposed within a single capillary as shown (e.g., ≥1, ≥2, ≥3, ≥4, or ≥5 straws, and/or ≤50, ≤20, ≤10). It is further to be appreciated that where the optical fiber 100 has a plurality of the nested capillaries 108 within a single capillary 104, nested capillaries 108 within a same capillary 104 may be different sizes from one another. Likewise the capillaries may vary in size, such as where one such capillary 104 may be coupled to the cladding 102 and have a size comparable to the nested capillary 108, for example, but distinguished therefrom by not being within a capillary 104 for example.

As shown with dashed lines in FIG. 1, the optical fiber 100 may include one or more coating layers 116, 118 on the outer surface 112 of the cladding 102. These coating layers 116, 118 may be primary-(116) and secondary-coating layers (118). According to an aspect, the coatings layers 116, 118 may be or include, for example, a polymer, such as an ultra-violet-light curable polymer (e.g., acrylate, polyimide, silicone) and may be configured such that the secondary coating layer 118 is harder than the primary coating layer 116. In further embodiments, one or more of the coating layers 116, 118 may be or include a coded or unique colorant, or an additional ink or coating layer, to help facilitate identification of the corresponding optical fiber 100 from among a group of such optical fibers.

Still referring to FIG. 1, according to an aspect, portions of walls SCW of the cladding 102 face one another across the center C of the optical fiber 100 (or other portion of an optical fiber) and also border a hollow core 106 (e.g., passage, hollow passageway) extending through the optical fiber 100. Put another way, in the center C of the optical fiber 100, when viewed in cross-section as shown in FIG. 1, the optical fiber 100 includes the hollow core 106 between the capillaries 104 and nested capillaries 108, where the capillaries 104 at least partially border and thereby define the hollow core 106.

The hollow core 106 may be used for optical communications, such as where signals conveyed in light pass longitudinally through the hollow core 106 and along the optical fiber 100. Furthermore, the capillaries 104 and nested capillaries 108 therein may serve as features of the optical fiber 100 that mitigate resonance of light conveyed through the hollow core 106. While the optical fiber 100 includes the cladding 102, capillaries 104, nested capillaries 108, and hollow core 106, other specialized optical fibers or fiber designs may benefit from teachings of the present disclosure. For example, Applicants contemplate that the hollow core 106 may be offset from the center C of an optical fiber, or an optical fiber may have two or more such hollow cores 106.

Figure 2:
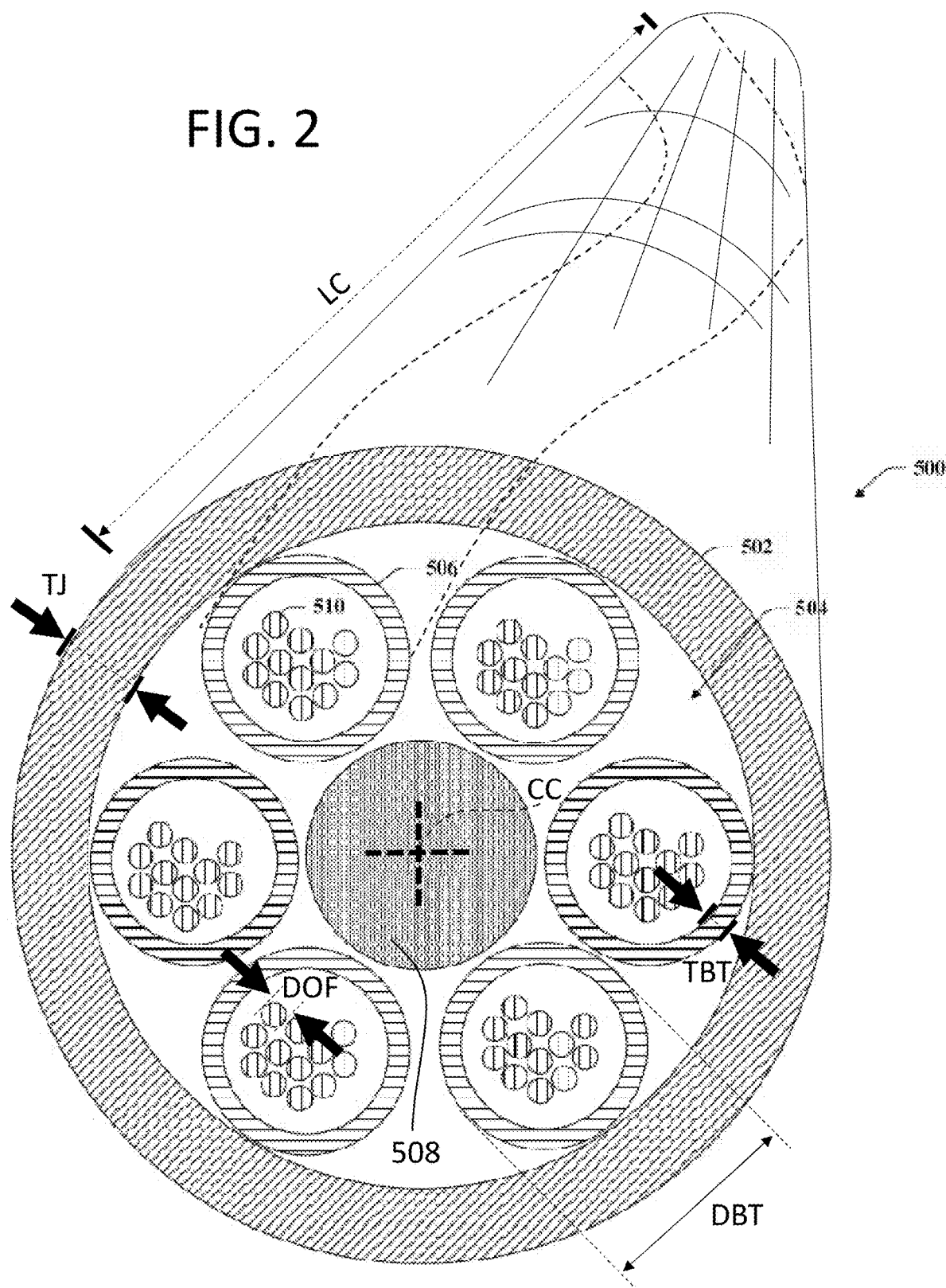
FIG. 2 is a cross-sectional view of an optical fiber cable according to an aspect of the present disclosure.

Referring now to FIG. 2, an optical fiber cable 500 is illustrated in cross-section. The cable 500 includes a cable jacket 502, which surrounds a communication element of the cable 500, such as an optical fiber 510, which may correspond to the optical fiber 100 of FIG. 1. The cable 500 is of a configuration that may be particularly useful for hollow-core optical fibers, when parts of the cable 500 are arranged as disclosed herein. Perhaps surprising, the structure of the cable 500, with buffer tubes 506 and optical fibers 510 surrounded by the cable jacket 502, parallels structure of the optical fibers 510, such as optical fiber 100 having the cladding 102, capillaries 104, and nested capillaries 108.

Applicants find the nested structure of the cable 500, when viewed in cross-section, with round cable jacket 502 to round buffer tubes 506, to round optical fibers 510 (e.g., optical fiber 100), to cladding 102 that may be round, to round capillaries 104, to round nested capillaries 108, to facilitate bending flexibility because the corresponding elements are largely free of bend preference, and also to facilitate strength of the cable 500 traverse to length because rounded arcs bear loading. That said, dimensions of parts and relationships therebetween of the cable 500 shown in FIG. 2 may not be to scale in FIG. 2 (or in other figures herein). For example, a ratio of jacket thickness TJ to widest cross-sectional dimension (e.g., diameter) DOF of the optical fiber 510 (i.e. TJ/DOF) may be greater than that ratio with dimensions shown in FIG. 2.

According to an aspect of the present disclosure, for example, optical fibers 510 of the cable 500 may be positioned relatively closer to a center CC of the cable 500 than shown, such as when the cable is stretched longitudinally (e.g., at 50° C., with polymer of the cable jacket 502 in an expanded state; or when the cable is tensioned under its own weight between telephone poles). As such, available space for movement of the optical fibers 510 compensates for glass of the optical fiber(s) having greater modulus of elasticity (e.g., much greater; ≥×50, ≥×100 on average over elastic range of the glass; e.g., 70 GPa for the glass versus 0.1 GPa for the polymer) and lower coefficient of thermal expansion (e.g., much lower; ≤×(1/5), ≤×(1/10) on average over the temperature range of 0-300° C.; e.g., 9E-6/° C. for the glass versus 160E-6/° C. for polymer) than polymer of the cable jacket 502 or other parts of the cable 500.

According to an aspect of the present disclosure, as shown in FIG. 2, the cable jacket 502 may surround and accordingly define an interior cavity 504 of the cable 500. The cable jacket 502 may have a substantially circular outside profile in cross-section, and the cable 500 may have little to no bend preference, which may case placement of the cable 500 during installation of the cable 500 around curves. Accordingly, as shown in FIG. 2, the interior cavity 504 of the cable 500 may have a substantially circular cross-section. That said, Applicants contemplate other cable geometries, such as ellipsoid in cross-section, obround in cross-section. For cables with a thin cable jacket 502, the shape of the cable jacket 502 in cross-section may also largely be a function of adjoining interior components of the cable 500, such as having bulges corresponding to underlying buffer tubes 506.

According to an aspect, the cable jacket 502 comprises a polymer that may be resistant to abrasion and corrosion, as well as water resistant. The cable jacket 502 may comprise polyethylene or polyvinyl chloride for example. In some instances, the cable jacket 502 may be made with flame retardant materials, or low-smoke-zero-halogen materials. According to an aspect, the cable jacket 502 is extruded over parts therein, including the communication element. Thickness TJ of the cable jacket 502 may be greater than 0.5 mm, such as greater than 1 mm, and/or less than 2 cm, such as less than 1 cm, such as less than 5 mm.

Jacket thickness JT and material thereof influence bending performance of the cable 500, and also help to prevent buckling and/or over-bending of the optical fiber 510, which may attenuate signals communicated thereby. The cable jacket 502 and associated thickness JT may protect the optical fibers 510. According to an aspect, for a polymer-based cable jacket 502, such as comprising (e.g., consisting more than 50% by volume of, >80 vol %, >90 vol %, such as 100%) polyethylene or polyvinyl chloride, thickness JT of the cable jacket 502 is at least 5 times the widest cross-sectional dimension DOF (i.e. orthogonal to a length thereof; e.g., diameter) of an optical fiber 510 therein, such as at least 10 times, at least 15 times, and/or less than 500 times, such as less than 200 times. According to an aspect, for a polymer-based cable jacket 502, such as comprising (e.g., consisting more than 50% by volume of, >80 vol %, >90 vol %, such as 100%) polyethylene or polyvinyl chloride and for optical fiber 510 having features of the optical fiber 100 of FIG. 1, the jacket thickness JT is at least 50 times thicker than the thickness TOC of the cable jacket 502 (see FIG. 1), such as at least 100 times, such as at least 200 times, and/or not more than 20,000 times thicker.

Still referring to FIG. 2, the cable 500 comprises a buffer tube 506 (e.g., buffer, container, sheathing), such as more than one buffer tube 506, and a strength member 508, such as a central strength member, located in the center CC of the cable 500. The buffer tube 506 and strength member 508 are disposed within the interior cavity 504 of the cable jacket 502. The strength member 508 differentiates the analogy between the cable 500 and optical fiber 100 structures, where the strength member 508 is not a hollow core 106.

The strength member 508 may comprise a bundle of aramid fibers, glass-reinforced plastic, steel cable, or other material that may be designed to support axial loading, such as in tension and/or in compression. In other contemplated embodiments, the strength member 508 or multiple such strength members may be embedded in the cable jacket 502.

According to an aspect, the buffer tube 506 comprises a polymer that may be resistant to abrasion and corrosion, as well as water resistant. The buffer tube 506 may comprise a polypropylene, polyvinylchloride, polybutylene terephthalate, polyethylene, or another polymer; or for alternative tight-buffer designs with the buffer tube 506 snuggly holding a single optical fiber 510, material thereof may comprise a polymer such as a fluoropolymer, such as polyvinylidene fluoride, polytetrafluoroethylene, or polyurethane for example, or may comprise another polymer. As with the cable jacket 502, in some instances, the buffer tube 506 may be made with flame retardant materials, or low-smoke-zero-halogen materials. The buffer tube 506 may have a two-layer construction where a first layer (e.g., interior layer, exterior) comprises polycarbonate and a second layer comprises polybutylene terephthalate (PBT) or other combinations of materials. Such two-layer constructions may provide additional mechanical protection for optical fibers 510 beyond that provided by single-layer of buffer tubes 506 of materials above.

According to an aspect, a widest cross-sectional dimension DBT (e.g., diameter unflattened) of the buffer tube 506 is at least 0.5 mm (e.g., for tight buffer), such as at least 2 mm (e.g., for loose tube), and/or no more than 1 cm, such as less than 7 mm, such as less than 5 mm. According to an aspect, the buffer tube 506 is extruded over parts therein, such as the optical fiber 510 (or optical fibers, such as 1, 3, 6, 9, or 12 optical fibers) and a means for blocking water, such as water-swellable powder (e.g., grains of superabsorbent polymers, such as cross-linked polyacrylates and/or polyacrylamides), water-swellable yarn, and/or gel or grease, for example; or for tight buffers, just the optical fiber 510. Gel or grease may impart less stress on the optical fiber 510 than powder for example, however powder and yarn may be less messy to handle when accessing the optical fiber 510. That said, some optical fiber 510 may be fully functional in "dry" buffer tubes, such as those with super absorbent polymer particles (both the standard type and the Kalahari round type), where the polymer in powder form may be at least partially bonded to interior walls of the respective buffer tubes 506. Optical fibers 510 in a buffer tube 506 may differ from one another by color and/or marking (e.g., repeating symbols, patterned colors), and/or structure (e.g., solid-core fibers, multi-core fibers, hollow-core fibers, single-mode, and/or multi-mode). Similarly, the buffer tubes 506 themselves may differ from one another by color and/or marking and/or structure (e.g., diameter, wall thickness, cross-sectional geometry).

The buffer tube 506 helps protect and isolate the optical fiber 510 from forces applied to the cable 500 and from interaction with other elements within the cable 500, such as the strength member 508 for example. For example, the cable 500 may stretch or compress, and the optical fibers 510 may move to low stress positions within the respective buffer tubes 506. However, thickness TBT and material of the buffer tube 506 influences bending characteristics thereof, and the buffer tube 506 may further benefit from flexing and shifting within the cable jacket 502, as the cable 500 is bent or otherwise deformed to allow movement of the optical fibers 510 to low-stress positions. According to an aspect, wall thickness TBT of the buffer tube 506 is greater than 40 µm, such as greater than 80 µm, and/or less than 500 µm. Other thicknesses TBT are contemplated, such as less than 40 µm for a thin-walled buffer tube, or greater than 500 µm, such as for thick tight buffer.

According to an aspect, for a polymer-based cable jacket 502, such as comprising polyethylene or polyvinyl chloride and for buffer tube 506 containing the optical fiber 100 of FIG. 1, the cable jacket thickness JT is at least 10 times thicker than the thickness TBT of the wall of the buffer tube 506, such as at least 20 times, and/or not more than 500 times thicker. According to an aspect, for a polymer-based buffer tube 506, such as comprising polypropylene, polyvinylchloride, polybutylene terephthalate, or polyethylene and for the optical fiber 510 having features of the optical fiber 100 of FIG. 1, the wall thickness TBT of the buffer tube 506 is at least 5 times thicker than the thickness TOC of the cladding 102 (see FIG. 1), such as at least 10 times, such as at least 20 times, and/or not more than 2000 times thicker, such as not more than 1000 times thicker.

Referring to FIG. 2 again, the cable 500 further comprises the optical fiber 510, positioned within the buffer tube 506, positioned within the cable jacket 502. According to an aspect, the buffer tube 506 is a loose tube buffer, and holds a plurality of optical fibers 510. The optical fibers 510 contact other optical fibers in the buffer tube 506, and have space to move relative to one another in the buffer tube 506. The space and freedom may allow the optical fibers 510 to position themselves in low-stress orientations within the buffer tube 506, within the cable 500, where some or each of the optical fibers 510 may be so-called hollow-core fibers and have attributes described herein (e.g., fragile nature, sensitivity to attenuation) such as with respect to optical fiber 100. The buffer tubes 506 of the cable 500 in FIG. 2 each hold twelve optical fibers 510, where each of the twelve may be uniquely colored or otherwise marked for differentiation and identification.

Figure 3:
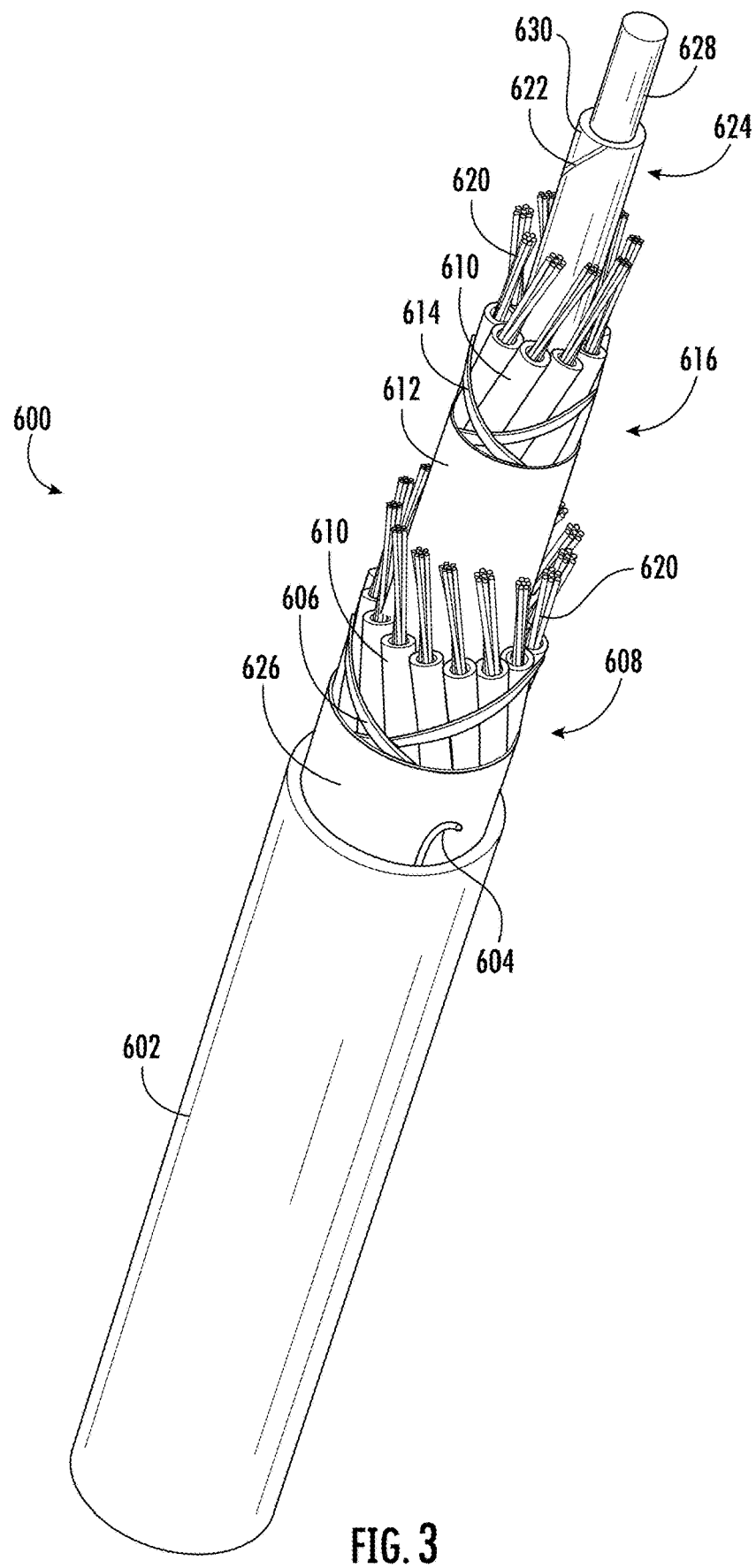
FIG. 3 is a perspective cross-sectional view of another optical fiber cable, not necessarily to scale, but generally representative of a loose-tube optical fiber cable.

While cable 500 of FIG. 2 is a relatively simple, conceptual design, a cable 600 in FIG. 3 represents another design that may use technology disclosed herein to advantageously support specialized optical fibers 620 as disclosed herein, such as the optical fiber 100 of FIG. 1 or the optical fibers 510 of FIG. 2. As with the cable 500 of FIG. 2, the cable 600 shown in FIG. 3 may not be drawn to scale or show dimensions or geometric relationships disclosed herein, but features and elements of the cable 600, as now further explained, may be present with technology disclosed herein.

According to an aspect, the cable 600 includes a cable jacket 602 of materials and thicknesses disclosed above, similar to the cable jacket 502. Just beneath the cable jacket 602, the cable 600 includes a ripcord 604, which may be used to facilitate opening the cable jacket 602 to access contents therein, such as optical fibers 620. Such a cable jacket 602 may alternatively or further include embedded discontinuities of material (so-called 'fast-access features'), which may facilitate tearing open the cable jacket 602 to access contents therein, such as in place of the ripcord 604 or in addition thereto.

Beneath the cable jacket 602, the cable 600 of FIG. 3 includes water-swellable tape 626, which may carry super-absorbent polymer configured to expand if water enters the cable jacket 602 to thereby help block flow of water along the cable 600. While the cable 600 may be made entirely of dielectric materials (e.g., plastic, fabric, and glass), other cables that use technology disclosed herein may be armored, such as with a spirally-wrapped, corrugated, or otherwise arranged metallic layer adjoining the cable jacket 602, interior thereto, which may help prevent puncture or crushing of the respective cable 600.

Also, beneath the cable jacket 602, the cable 600 includes binder cords 606 wrapping around a first group 608 (e.g., first ring, outer ring) of buffer tubes 610. Alternatively, such a cable may include a "thin-film binder" instead of binder cords 606. The buffer tubes 610 themselves may hold optical fibers 620 as disclosed herein, such as the optical fiber 100 of FIG. 1. Interior to the first group 608 of buffer tubes 610, the cable 600 includes another water-swellable tape 612 and binder cords 614 holding a second group 616 (e.g., inner ring, inner group, inside group) of buffer tubes 610 supporting yet more optical fibers 620. Interior to the second group 616 of buffer tubes 610, the cable 600 of FIG. 3 further includes a water-swellable yarn 622 wrapped around an up-jacketed strength member 624. Up-jacketing, such as by extruding polyethylene 630 over a glass-reinforced plastic core 628, increases the diameter of the strength member 624 to fit more buffer tubes 610 in a second group 616 (e.g., inner group, inner ring).

Referring still to FIG. 3, according to an aspect of the present disclosure, the buffer tubes 610 may be at least partially wrapped around the strength member 624, within the cable jacket 602. As shown, the first group 608 is wrapped (helically) around the strength member 624 in a left-handed helix, while the second group 616 is wrapped around the strength member 624 in a right-handed helix. Use of a helix allows for consistent and uniform bending of the optical fibers 620 within the cable 600, as opposed to an SZ strand for example, which changes the angle of the buffer tube 610 with respect to the strength member 624 as direction of the SZ strand reverses along a length of the strength member 624. With that said, Applicants contemplate cable configurations with optical fibers as disclosed herein that may SZ stranded or otherwise stranded (see generally dotted lines extending from the buffer tube 506 in FIG. 2).

An aspect of the cable 600 in FIG. 3 (which may not be shown to scale) is the angle of the helix of the buffer tubes 610 with respect to the strength member 624. According to an aspect, geometry of the stranding of the buffer tubes 610 along the strength member 624 (or other cable component about which the buffer tubes 610 may be stranded) may be arranged so that the buffer tubes 610 (i.e. a center line extending lengthwise along a geometric centroid of the respective buffer tube 610 in cross section orthogonal to length thereof) and optical fiber(s) therein (generally positioned within a center of the buffer tube 610 or possibly skewed away from the strength member 624, when the cable 600 is unstretched) curve around the strength member 624 and bend at a consistent rate.

According to an aspect, the consistent rate of bending is controlled at least in part by a helix angle and resulting in a lay length (i.e. lengthwise distance along the cable 600 corresponding to one rotation of the respective buffer tube 610 fully 360° around the strength member 624 or around the center of the respective cable 600) greater than 50 mm, such as greater than 70 mm, such as greater than 100 mm, and/or a lay length less than 10 m, such as less than 5 m, such as less than 2 m when the cable 600 is resting in a straight orientation and in an unstrained state, such as when measured resting on a flat floor at sea level at 20° C. and zero humidity. With that said, as further demonstrated by the Examples modeled below, for comparable bending of contents of buffer tubes 610 with different size strength members 624, or for comparable bending of buffer tubes 610 between different levels of stacked layers, as shown with groups 608 and 616, the respective lay length may change in order to have a desired bending of the optical fibers 620.

According to an aspect the buffer tubes 610 are stranded in the respective cable 600 to bend no more than a bending radius of 200 mm (i.e. radius≥200 mm) of the buffer tube 610 and/or of the optical fibers 620 therein, such as no more than a bending radius of 220 mm (i.e. radius≥220 mm), such as no more than a bending radius of 250 mm (i.e. radius≥250 mm), such as no more than a bending radius of 300 mm (i.e. radius≥300 mm), and/or at least a non-infinite bending radius, such as a bending radius of 10 m or less, such as at least a bending radius of 5 m or less, such as at least a bending radius of 1 m or less of the respective buffer tube 610 and/or of the optical fibers 620 therein. However, optical fibers 620 having attributes of the optical fiber 100, such as the cladding 102 and capillaries 104 with nested capillaries 108 defining the hollow core 106, may well have greater flexibility and tolerance for bending than the optical fiber 100, such as by selecting more flexible glass, narrowing the fiber diameter, coating selection, etc. As such, Applicants contemplate the cables may be configured for tighter radii of the optical fibers 620 and the buffer tubes 610 than 200 mm, such as less than 200 mm but at least 100 mm or even at least 50 mm.

Stranding of the buffer tubes 610, as well as optical fiber 620 contents thereof, allows for movement of the optical fibers 620 to lower stress positions within the cable 600 as the cable 600 strains, such as if the cable 600 is stretched in tension, where lesser stain in the optical fibers 620 in turn may improve communication performance by reducing instances of attenuation and failure. Although counterintuitive, according to an aspect, lay length of the buffer tubes 610 in the first group 608, or a group further from the strength member 624 about which the buffer tubes 610 are stranded, is greater than the lay length of the second group 616, closer to the strength member 624, such as by at least 2 mm, such as at least 5 mm, such as at least 10 mm, and/or no more than 1 m, such as no more than 50 cm, such as no more than 10 cm. One might expect the opposite because the buffer tubes of the second group 616 bend around a smaller or tighter radius core than those of the first group 608, so a longer lay length of the second group 616 may compensate for the tighter core. However, Applicants may strand the first group 608 with a greater lay length than the second group 616 to help maintain core integrity, i.e. so the cable 600 holds together. For example, for a cable 600 with greater than 100 optical fibers but less than 250 optical fibers, the lay length of the first group may be greater than 100 mm but the lay length of the second group may be less than 100 mm (e.g. 110 mm and 82 mm respectively), and for a cable 600 with greater than 250 optical fibers, the lay length of the first group may be greater than 110 mm and the lay length of the second group (interior) may be less than 110 mm (e.g., 125 mm and 100 mm respectively).

Referring to FIG. 2, an optical fiber 510 (see, e.g., optical fiber 100 of FIG. 1) may have the length LF and may be disposed within an optical fiber cable 500 (FIG. 2), which itself may have a length LC that is less than LF, where the optical fiber 510 within the cable 500 may exhibit bending, even when the cable 500 is positioned in a substantially straight, unstretched manner. As used herein, the amount by which the length LF of the optical fiber 510 exceeds the length LC of the cable 500, in which the optical fiber 510 is disposed, is referred to as "excess fiber length" or EFL, which may be expressed as a percentage of the length LC of the cable 500.

EFL is in the cable 500 of FIG. 2 and the cable 600 of FIG. 3 may be largely a function of stranding of the buffer tubes 506, 610 in the respective cable 500, 600, and may be greater than zero; but due to long lay lengths, EFL may be less than 10%, such as less than 7%, such as less than 5%, such as less than 3%, and in some instances less than 2% or even 1% of the cable length LC, such as for at least some tubes in the respective cable (see generally second group 616 of the buffer tubes 610 of the cable 600 in FIG. 3).

According to an aspect, the buffer tubes 610 are extruded around the optical fibers 620, and the optical fibers 620 are moved along with the extrusion so as to limit excess fiber length ("EFL2") of the optical fibers 620 within the buffer tubes 610 with respect to length of the buffer tubes 610 (as opposed to EFL with respect to the length LC of the cable 600). As a result, the optical fibers 620 are positioned largely in the center CC of the respective buffer tubes 610 when the cable 600 is laying straight and unstretched; and as such have some room to migrate within the buffer tubes 610 to low-stress positions as the respective cable 500, 600 is bent, stretched, twisted, and/or compressed. According to an aspect, optical fibers 620 in at least one of the buffer tubes 610 of the cable 600 (or cable 500) have EFL2 greater than or equal to zero to less than 5% with respect to the length of the buffer tube 610, such as less than 3%, such as less than 2%, such as less than 1%, or even less than 0.5% for example.

EXAMPLES

Figure 4:
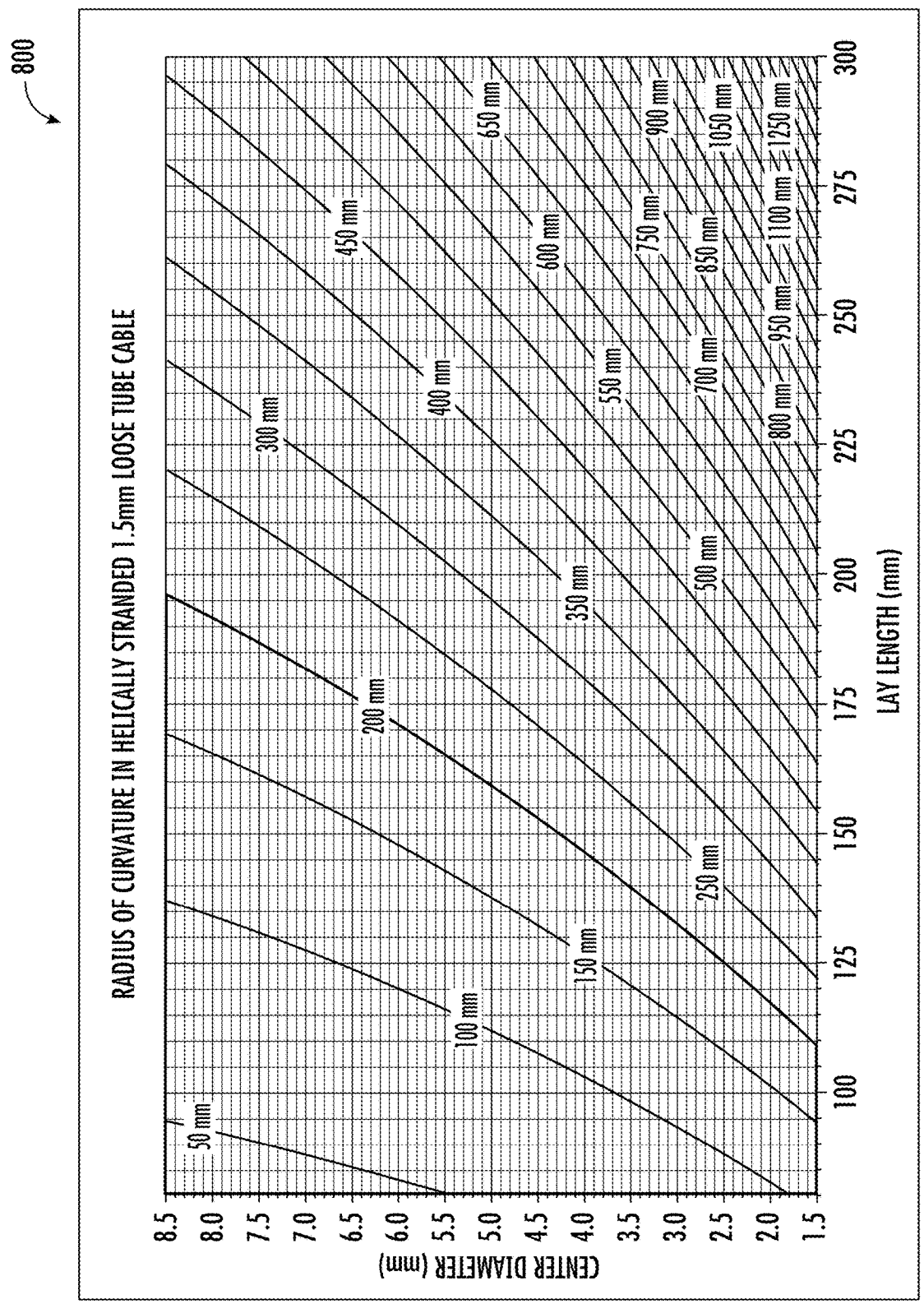
FIG. 4 is a plot illustrating relationships among various cable construction parameters according to a first example model.

The inventors modelled radius of curvature of optical fibers 510 disposed within the buffer tubes 506 of the cable 500 of FIG. 2 as a function of diameter of the strength member 508 and outside diameter of the buffer tubes 506 (see DBT in FIG. 2). The model assumes that the buffer tubes 506 have substantially identical outside diameters and lay lengths of the helical stranding of the buffer tubes 506. Referring now to FIG. 4, a plot 800 illustrates a relationship between lay length of the buffer tubes 506, diameter of the strength member 508, and radius of curvature of the optical fibers 510.

In the plot 800, lay length in millimeters is shown along the x-axis and diameter of the strength member 508 is shown along the y-axis. In the plot 800, a curve is shown for each of several radii of curvature of the optical fibers 510, where each curve indicates combinations of lay length and central strength member diameter that yield the indicated radius of curvature. The plot 800 assumes zero EFL for the optical fibers 510 with respect to the buffer tubes 506, and a 1.5 mm outside diameter of the buffer tubes 506.

As in the plot 800, combinations of differently-sized lay lengths and central strength member diameters that yield a radius of curvature for an optical fiber of tighter than than 200 mm are shaded to indicate a likelihood of permanent damage to the optical fiber 510 for such combinations, where bending exceeding 200 mm radius of curvature (i.e. bend radius <200 mm) is a threshold in the model. For example, embodiments of the cable 500 may satisfy the inequality d≤0.092l−10.5, where d is the diameter of the strength member 508 (e.g., central strength member) and/is the lay length of the buffer tubes 506, are likely to maintain the optical fiber 510 with a minimum radius of curvature to avoid fiber breaks according to the example model when the buffer tubes 506 having an outside diameter of 1.5 mm+5%.

Figure 5:
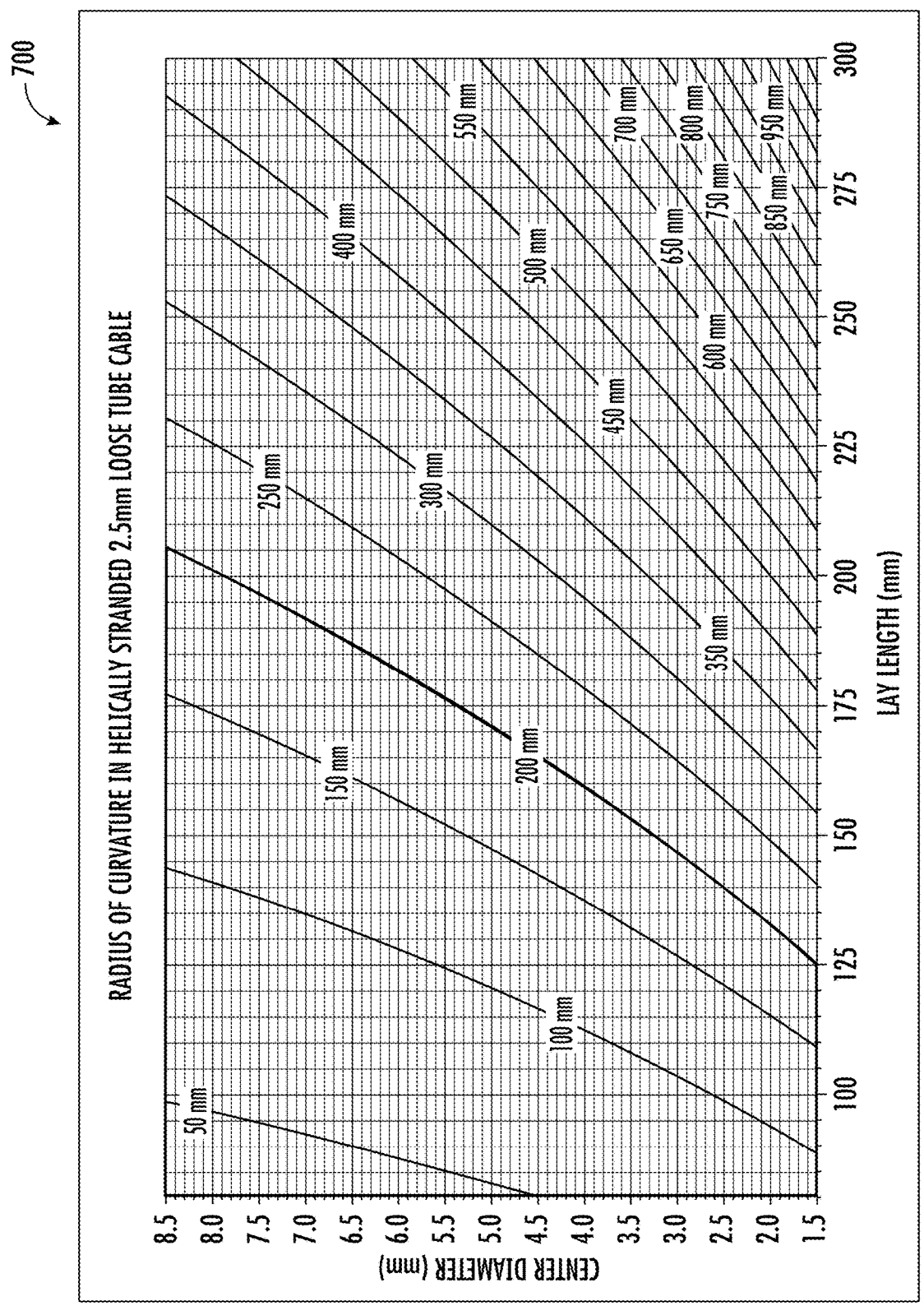
FIG. 5 is a plot illustrating relationships among various construction parameters according to a second example model.

Referring now to FIG. 5, plot 700 illustrates another modelled relationship between lay length of the buffer tubes 506, diameter of the strength member 508 (e.g., central strength member), and radius of curvature of optical fibers 510. The plot 700 is substantially similar to the plot 800 of FIG. 4, but illustrates the relationships among lay length, central strength member diameter, and radius of curvature of the optical fibers 510 when the buffer tubes 506 have outside diameters of 2.5 mm. Embodiments of the optical fiber cable 500 where the buffer tubes 506 have outside diameters of 2.5 mm+5% and that satisfy the inequality d≤0.075l−6.875 may be likely to maintain optical fibers 510 with a minimum radius of curvature to avoid breaks of the optical fibers according to the second example model.

According to an aspect, the buffer tubes 506 may have an outer diameter (from one outside surface of the buffer tube, through buffer tube, through the geometric center orthogonal to length of the space within the buffer tube, back through the buffer tube wall, and to the other outside surface of the buffer tube) of no more than 5.0 mm, such as no more than 3.0 mm, such as no more than 2.75 mm, and/or at least 0.5 mm, such as at least 0.8 mm. Similarly, according to an aspect, the buffer tubes 506 may have an inner diameter (from one inside surface of the buffer tube, through the geometric center orthogonal to length of the space within the buffer tube, and to the other inside surface of the buffer tube) of no more than 4.0 mm, such as no more than 2.0 mm, such as no more than 1.75 mm, and/or at least 0.3 mm, such as at least 0.5 mm.

What has been described above includes examples of one or more embodiments. It is, of course, not possible to describe every conceivable modification or alteration of the above systems, devices, or methodologies for purposes of describing the aforementioned aspects, but one of ordinary skill in the art can recognize that many further modifications and permutations of various aspects are possible. For example, in any of the cables 500, 600 the optical fibers 100, 510, 620 can be configured as loose fibers or intermittently-bonded, non-planar ribbons. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An optical fiber cable, comprising:
   a first capillary comprising glass and surrounding an interior passage thereof;
   a first nested capillary positioned within the interior passage of the first capillary,
   wherein the first nested capillary has an open space extending lengthwise therein;
   wherein the first nested capillary only fills a portion of the interior passage of the first capillary such that the interior passage is sized to fit at least another two more such nested capillaries therein;
   a first cladding having a round cross-section and surrounding the first capillary and in turn the first nested capillary,
   wherein the first capillary is fixed to an interior surface of the first cladding;
   wherein the first cladding likewise surrounds at least two other such capillaries fixed to the interior surface thereof,
   wherein each of the capillaries are positioned around the interior surface of the first cladding;
   wherein portions of exteriors of each of the capillaries line a hollow core therebetween, the hollow core configured to convey an optical signal communicated lengthwise therealong, whereby the first cladding, the first capillary, and the first nested capillary each form part of a first optical fiber;

a first buffer tube comprising a polymer and having a cross-sectional dimension orthogonal to a length thereof at least five times that of the first cladding;

wherein the first buffer tube surrounds the first optical fiber and at least two other optical fibers all loosely positioned with respect to one another within the first buffer tube such that the optical fibers are at least partially free to move with respect to one another in the first buffer tube; and a cable jacket surrounding a strength member, the first buffer tube, and at least two other buffer tubes comprising optical fibers comprising claddings, capillaries, and nested capillaries therein;

wherein each of the buffer tubes are stranded around the strength member within the cable jacket such that the optical fibers each have a longer length then the optical fiber cable, and wherein the stranding is such that the first buffer tube bends no tighter than an arc of 200 mm radius within the cable jacket.

2. The optical fiber cable of claim 1, wherein the first buffer tube has a thickness at least 5 times thicker than a thickness of the first cladding, and wherein the cable jacket has a thickness at least 5 times thicker than the thickness of the first buffer tube.

3. The optical fiber cable of claim 1, wherein the first optical fiber has a length greater than or equal to that of the first buffer tube, and less than 3% longer than the first buffer tube.

4. The optical fiber cable of claim 1, wherein the stranding is such that the first cladding bends no tighter than an arc of 200 mm radius within the first buffer tube.

5. The optical fiber cable of claim 1, wherein the first buffer tube comprises gel surrounding the first optical fiber and impeding a flow path for water through the first buffer tube.

6. The optical fiber cable of claim 1, wherein the first cladding comprises glass, wherein the glass of the first cladding comprises, in terms of mole percent on a representative oxide basis, at least 60 mol % silica, wherein the glass of the first cladding has a coefficient of thermal expansion and a modulus of elasticity, wherein the cable jacket comprises a polymer, wherein the polymer has a coefficient of thermal expansion greater than that of the glass of the first cladding and a modulus of elasticity less than that of the glass of the first cladding.

7. The optical fiber cable of claim 1, wherein when the optical fiber cable is at 50° C., tension in the strength member opposes compression in the cable jacket, while the optical fibers experience no stress or stress less than 5 MPa.

8. The optical fiber cable of claim 1, wherein when the optical fiber cable is at 50° C., hollow cores of the optical fibers move closer to the strength member on average than when the optical fiber cable is at 20° C.

9. The optical fiber cable of claim 1, wherein each of the capillaries are spaced apart from one another around the interior surface of the first cladding.

10. The optical fiber cable of claim 1, wherein the buffer tubes are a first group, wherein the optical fiber cable further comprises a second group of buffer tubes overlaying the first group, wherein the first and second groups are helically stranded in opposite directions from one another around the strength member, wherein the second group has a lay length that is greater than that of the first group.

11. An optical fiber cable, comprising:
a first capillary comprising glass and surrounding an interior passage thereof;

a first nested capillary positioned within the interior passage of the first capillary, wherein the first nested capillary has an open space extending lengthwise therein;

wherein the first nested capillary only fills a portion of the interior passage of the first capillary such that the interior passage is sized to fit at least another two more such nested capillaries therein;

a first cladding having a round cross-section and surrounding the first capillary and in turn the first nested capillary, wherein the first capillary is fixed to an interior surface of the first cladding;

wherein the first cladding likewise surrounds at least two other such capillaries fixed to the interior surface thereof, wherein the first cladding comprises glass, wherein the glass of the first cladding comprises, in terms of mole percent on a representative oxide basis, at least 60 mol % silica, wherein the glass of the first cladding has a coefficient of thermal expansion and a modulus of elasticity, wherein each of the capillaries are positioned around the interior surface of the first cladding;

wherein portions of exteriors of each of the capillaries line a hollow core therebetween, the hollow core configured to convey an optical signal communicated lengthwise therealong, whereby the first cladding, the first capillary, and the first nested capillary each form part of a first optical fiber;

a first buffer tube comprising a polymer and having a cross-sectional dimension orthogonal to a length thereof at least five times that of the first cladding;

wherein the first buffer tube surrounds the first optical fiber and at least two other optical fibers all loosely positioned with respect to one another within the first buffer tube such that the optical fibers are at least partially free to move with respect to one another in the first buffer tube; and a cable jacket surrounding a strength member, the first buffer tube, and at least two other buffer tubes comprising optical fibers comprising claddings, capillaries, and nested capillaries therein;

wherein the cable jacket comprises a polymer, wherein the polymer has a coefficient of thermal expansion greater than that of the glass of the first cladding and the polymer has a modulus of elasticity less than that of the first cladding;

wherein each of the buffer tubes are stranded around the strength member within the cable jacket such that the optical fibers each have a longer length then the optical fiber cable, wherein when the optical fiber cable is at 50° C., hollow cores of the optical fibers move closer to the strength member on average than when the optical fiber cable is at 20° C.; and wherein at 50° C., tension in the strength member opposes compression in the cable jacket, while the optical fibers experience no stress or stress less than 5 MPa.

12. The optical fiber cable of claim 11, wherein the first buffer tube has a thickness at least 5 times thicker than a thickness of the first cladding, and wherein the cable jacket has a thickness at least 5 times thicker than the thickness of the first buffer tube.

13. The optical fiber cable of claim 11, wherein the first optical fiber has a length greater than or equal to that of the first buffer tube, and less than 3% longer than the first buffer tube.

14. The optical fiber cable of claim 11, wherein the stranding is such that the first cladding bends no tighter than an arc of 200 mm radius within the first buffer tube.

15. The optical fiber cable of claim 11, wherein the first buffer tube comprises gel surrounding the first optical fiber and impeding a flow path for water through the first buffer tube.

16. The optical fiber cable of claim 11, wherein a diameter d of the strength member and a lay length $l$ of the buffer tubes stranded around the strength member satisfy an inequality of: $d \leq 0.075l - 6.875$.

17. The optical fiber cable of claim 16, wherein the diameter d and the lay length $l$ also satisfy an inequality of: $d \leq 0.092l - 10.5$.

* * * * *